United States Patent
Cheon

(10) Patent No.: US 7,254,479 B2
(45) Date of Patent: Aug. 7, 2007

(54) APPARATUS AND METHOD FOR DETERMINING GEOGRAPHICAL LOCATION RELATIVE TO A DESIGNATED GEOGRAPHICAL LOCATION WITH A MOBILE COMMUNICATION DEVICE

(75) Inventor: Mun Ki Cheon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 10/792,553

(22) Filed: Mar. 2, 2004

(65) Prior Publication Data

US 2004/0254718 A1 Dec. 16, 2004

(30) Foreign Application Priority Data

May 30, 2003 (KR) .................. 10-2003-0034906
Sep. 9, 2003 (KR) .................. 10-2003-0063398

(51) Int. Cl.
*G01C 21/26* (2006.01)
*G88G 1/123* (2006.01)

(52) U.S. Cl. ............. 701/200; 701/201; 701/207; 701/211; 701/25; 340/988; 340/995.1; 342/357.09

(58) Field of Classification Search ........ 701/200–201, 701/207–211, 213–215, 24–26; 340/988, 340/995.1; 342/357.06, 357.09, 357.12, 342/357.13; 33/319; 73/178 R
See application file for complete search history.

(56) References Cited

U.S. PATENT DOCUMENTS

| 4,512,667 | A | | 4/1985 | Doulton et al. |
| 4,763,268 | A | * | 8/1988 | Itoh et al. ............ 701/207 |
| 5,090,231 | A | * | 2/1992 | Gallagher ............ 702/92 |
| 5,546,310 | A | | 8/1996 | Ehdaie et al. |
| 6,266,614 | B1 | * | 7/2001 | Alumbaugh ............ 701/211 |
| 6,278,938 | B1 | * | 8/2001 | Alumbaugh ............ 701/208 |
| 6,633,813 | B1 | | 10/2003 | Deworetzki |
| 6,826,472 | B1 | * | 11/2004 | Kamei et al. ............ 701/202 |
| 2003/0103002 | A1 | | 6/2003 | Hasebe et al. |
| 2003/0148776 | A1 | | 8/2003 | Ciechanowiecki et al. |

FOREIGN PATENT DOCUMENTS

| CN | 1418036 | | 5/2003 |
| EP | 0995973 | A2 | 4/2000 |
| EP | 0995973 | A3 | 3/2003 |
| JP | 63-135213 | | 5/1998 |
| JP | 2001-159538 | | 6/2001 |
| JP | 2001-289646 | | 10/2001 |
| JP | 2003-130672 | | 5/2003 |
| KR | 2001-0002226 | | 8/2001 |
| KR | 1020030038494 | A | 5/2003 |
| KR | 1020040069866 | | 8/2004 |
| WO | WO 00/14481 | | 3/2000 |
| WO | WO 00/62131 | | 10/2000 |
| WO | WO 02/065151 | A2 | 8/2002 |
| WO | WO 02/080606 | A1 | 10/2002 |

\* cited by examiner

*Primary Examiner*—Yonel Beaulieu
(74) *Attorney, Agent, or Firm*—Lee, Hong, Degerman, Kang & Schmadeka

(57) ABSTRACT

The present invention apparatus and method that allows the geographical location of a user with respect to a designated geographical location to be determined in a manner that cost-efficient, the user given several options regarding the way in which his of her present location is determined as well as the format in which the user's relative position to the designated geographical location is represented and the apparatus being easy to operate and relatively lightweight.

38 Claims, 18 Drawing Sheets

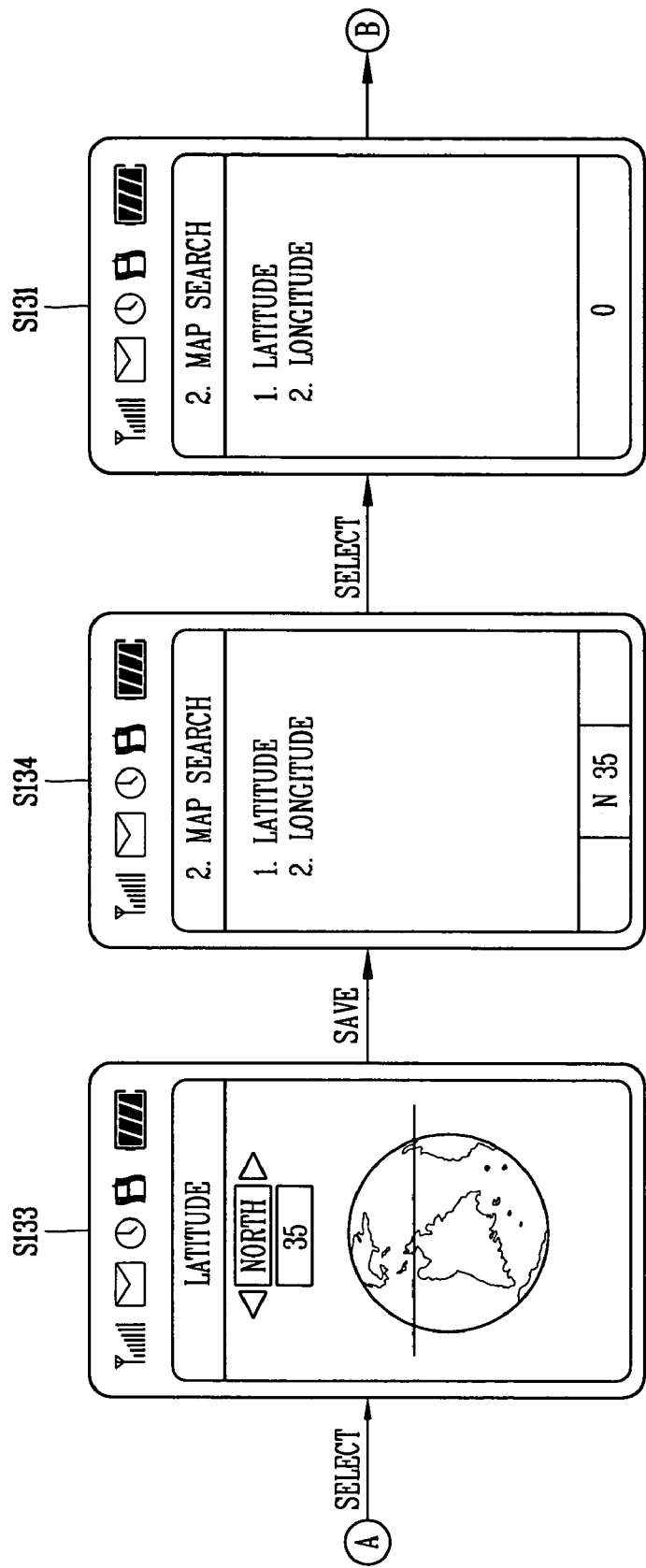

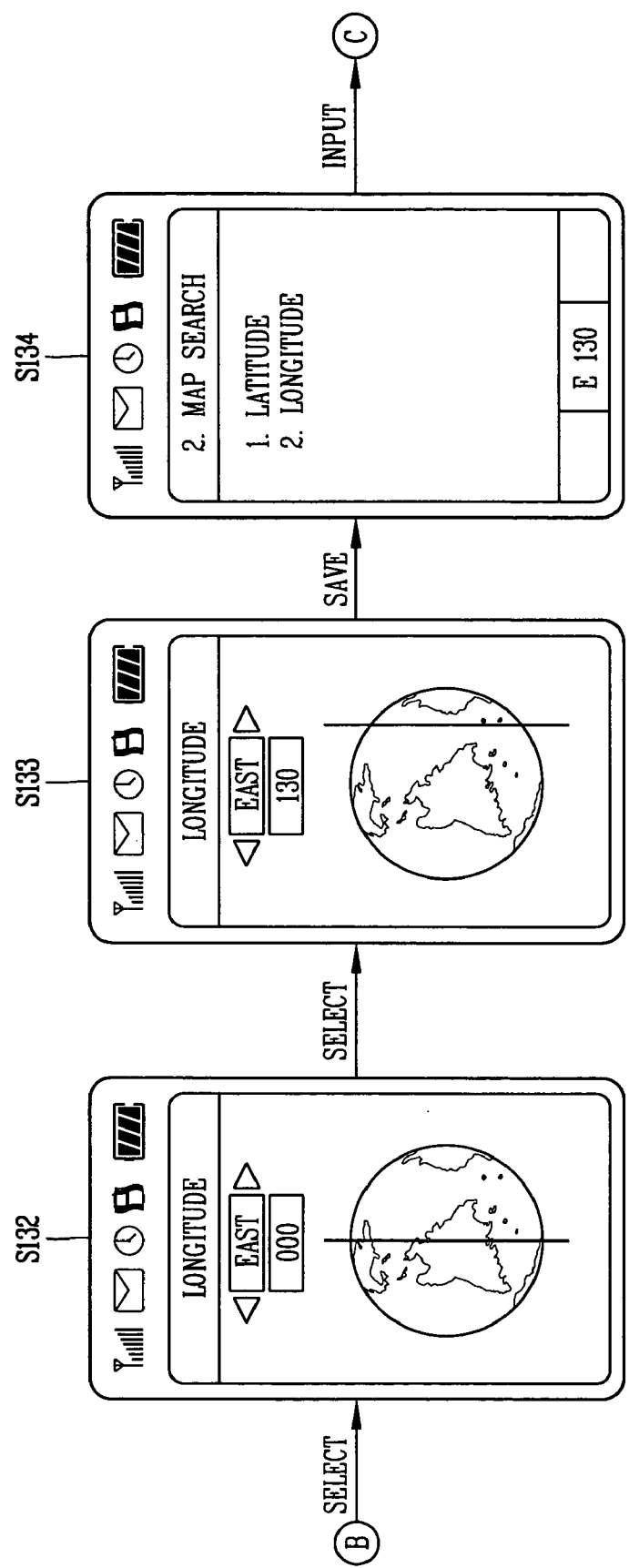

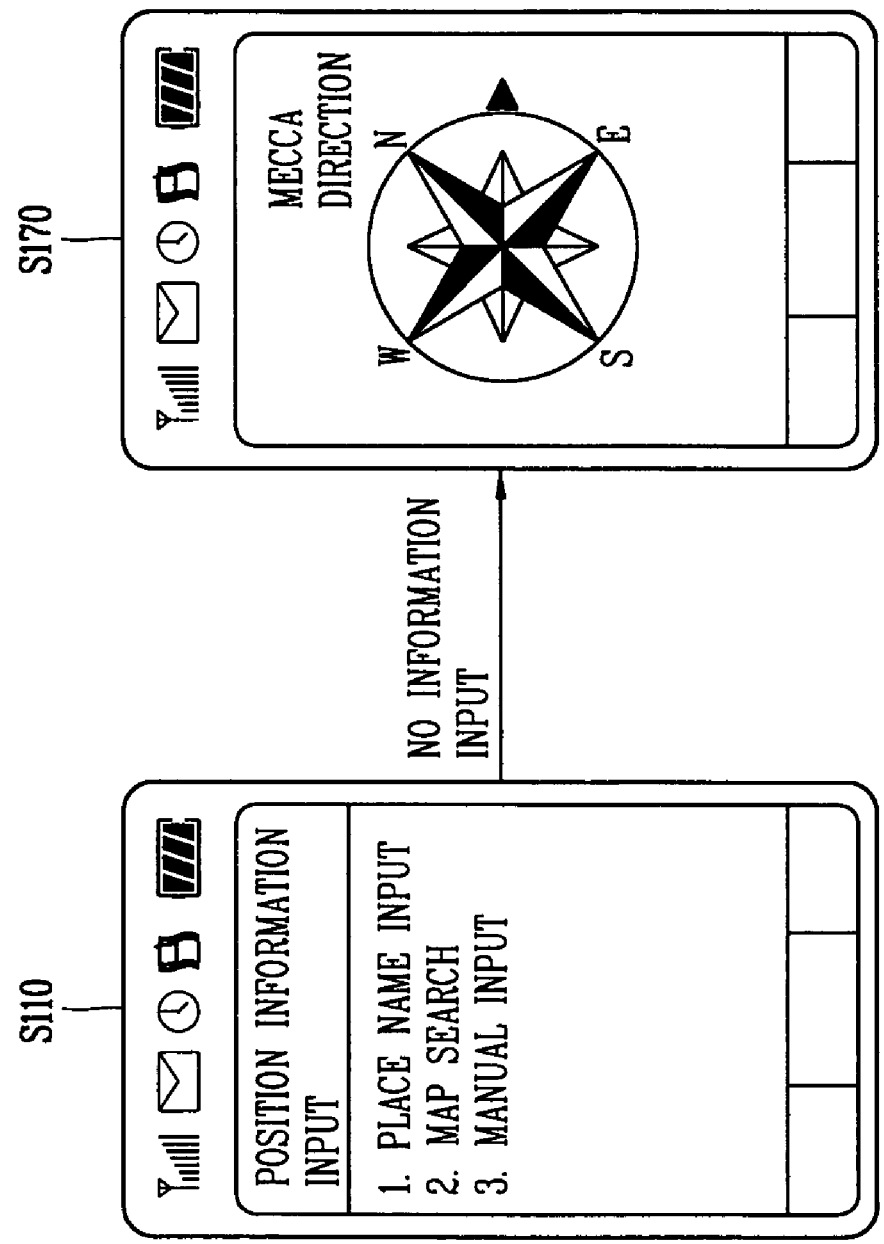

APPARATUS AND METHOD FOR DETERMINING GEOGRAPHICAL LOCATION RELATIVE TO A DESIGNATED GEOGRAPHICAL LOCATION WITH A MOBILE COMMUNICATION DEVICE

CROSS-REFERENCE TO RELATED APPLICATIONS

Pursuant to 35 U.S.C. § 119(a), this application claims the benefit of earlier filing date and right of priority to Korean Application No. 34906/2003, filed on May 30, 2003 and Korean Application No. 63398/2003, filed on Sep. 9, 2003, the contents of which are hereby incorporated by reference herein in their entirety:

BACKGROUND OF THE INVENTION

1. Field of the Invention

The present invention relates to an apparatus and method for providing directional information related to a designated geographical location, and more particularly, to a mobile communication device that allows the user several options through which his present geographical location relative to the Islamic holy land of Mecca may be determined, the communication device easy to manufacture, cost-efficient to produce and operate, and relatively lightweight.

2. Description of the Related Art

Generally, a mobile communication system enables a user to move freely within a corresponding service area while communicating by wireless technology using a subscribed/registered mobile terminal or mobile station (MS). Such mobile communication systems are designed to provide ease of use, low price, and various additional services in order to encourage users to purchase the mobile terminals and subscribe to the system.

There are a variety of races and religions in the world. One such religion is Islam, which requires its followers, Muslims, to worship on their knees five times a day in the direction of Mecca, the Islamic Holy Land. This ritual, called Salah, is a religious duty of all Muslims.

The obligatory Salah rituals are Fajr, Zuhr, Asr, Maghrib, and Isha. Fajr involves praying in the direction of Mecca between daybreak and dawn. Zuhr involves praying in the direction of Mecca between noon and midday. Asr involves praying in the direction of Mecca between midday and sunset. Maghrib involves praying in the direction of Mecca right after sunset. Isha involves praying in the direction of Mecca between midnight and daybreak. Additionally, there are other rituals such as Friday noon service, additional obligatory service, and free service in addition to the five obligatory rituals of Salah, each involving praying in the direction of Mecca.

Muslims must worship on their knees in the direction of Mecca at the designated time. Failing to worship as required is regarded a sin to be punished according to Islamic dogma. Therefore, it is very important for Muslims to easily and quickly determine the direction or position of Mecca with respect to their current position on Earth. For example, the first thing that Muslim travelers or nomads do when they travel is to determine their location with respect to Mecca.

A Muslim who is traveling is allowed to use a mobile communication device to communicate. Presently, the number of Muslims in the world is about 1.6 billion, a large potential market for mobile communication devices that are tailored to their specific needs.

There have been attempts to address the requirements of Islam through mobile devices. For example, a mobile communication device that indicates the position of Mecca relative to the user is disclosed in PCT/IT99/00228 (Jul. 20, 1999), which teaches the use of a GPS (global positioning system) receiver and an Earth-magnetic sensor in a system exclusively for indicating the location of Mecca. Another device, disclosed in Korean Patent Laid-Open No. 2003-38494 (May 16, 2002), also uses a GPS receiver and an earth-magnetic sensor. Other devices that are known in the art utilize a service provider or network operator to determine the relative position of Mecca.

Systems that require an Earth-magnetic sensor and GPS receiver are larger and cumbersome to carry as well as requiring additional manufacturing time, all factors that increase product cost. Similarly, using a system provider or network operator increases the cost of using the system.

Therefore, there is a need for a relatively lightweight and easy to use mobile communications device that can provide the user with information regarding his geographic position on the Earth relative to Mecca in a cost-effective manner. The present invention addresses these and other needs.

SUMMARY OF THE INVENTION

The present invention is directed to a to a mobile communication device that allows the user to determine his geographical location relative to another designated geographical location, the device easy to manufacture, cost-efficient to produce and operate, and relatively lightweight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication device that allows the user several options through which his present geographical location may be determined in order to provide his or her geographical location relative to a designated geographical location. Specifically, the user manually enters his exact geographical location or enables the mobile communication device to determine his exact geographical location and the device then provides the user with directional information indicating the user's relative position with respect to the designated geographic location. Although the invention is described herein with regard to determining the user's relative position with respect to Mecca, it is contemplated that the invention may be utilized for any designated geographic location for which the exact geographic location is known.

In one aspect of the invention, a wireless communication apparatus is provided, the apparatus including a means for determining the present location of the user, a means for storing geographic location information, a means for determining the geographic location of the user relative to a designated geographic location, a means for conveying information to the user, and a control means for coordinating the functions of and transfer of information between the other means. A compass means may also be included for translating the present location of the user into compass point information (a display of a needle pointing North, South, East West, etc.).

The storage means contains information regarding the location of the designated geographic location, for example latitude and longitude information for Mecca. Once the present location of the user is determined, the user's location relative to the designated geographic location may be determined.

It is contemplated that the storage means may contain information corresponding to any geographic location desired as the designated geographic location. It is further contemplated that the storage means may contain information corresponding to predetermined major cities and countries throughout the world as well as well-known landmarks and destinations. Moreover, it is contemplated that an electronic map may be stored in the storage means.

The present location of the user may be determined either by the location of the apparatus or by utilizing user information inputted manually via an input device. It is contemplated that the input device may be either a keyboard or keypad, on which the user types information, or a voice unit that allows the user to enter information verbally.

If present location is determined by the location of the apparatus, a processing means communicates with the base station corresponding to the cell in which the apparatus is located and receives information corresponding to the present location of the apparatus. The processing means then compares the information received from the base station to information stored in the storage means corresponding to the designated location to determine the user's relative location.

If present location is determined utilizing user information, it is contemplated that several methods may be utilized. For example, the user may enter the exact latitude/longitude corresponding to his or her present location. Furthermore, the user may convey his or her present location by indicating location an electronic map displayed on a display means. Moreover, the user may indicate the name of a major country or city in the world in which he or she is located or a major landmark which is nearby.

If the user enters the exact latitude/longitude corresponding to the present location, a processing means compares that information directly to latitude/longitude information stored in the storage means for the designated location to determine the user's relative location.

If an electronic map is utilized, a processing means retrieves information from the storage means corresponding to a point on the electronic map indicated by the user. If the user enters the name of a country, city or landmark, a processing means retrieves information from the storage means corresponding to a predetermined name of a country, city or landmark throughout the world. The retrieved information is compared to information stored in the storage means corresponding to the designated location to determine the user's relative location.

An iterative process may be used to allow the user to specify his or her present location in greater detail. For example, the user may indicate his or her location as a point on an electronic map of the world. The displayed map them may be adjusted to provide further detail of the area indicated by the user and the user allowed to enter information further detailing his present location.

It is contemplated that the storage means may contain latitude/longitude information corresponding to the designated location as well as to points on an electronic map or predetermined names of countries, cities and landmarks. The latitude/longitude information corresponding to the designated location is compared to the latitude/longitude information corresponding to the user information to determine the user's relative location.

It is further contemplated that, rather than latitude/longitude information, the storage means may contain information corresponding to the relative location of the designated location to points on an electronic map or to predetermined countries, cities or landmarks. The information in the storage means corresponding to the user information would be transferred directly to a display means as the user's relative location.

The compass means may be an electronic compass or a manual compass. Providing an electronic compass increases the size, complexity and cost of manufacture of the apparatus. A manual compass provides a less-complex, more cost-effective apparatus. If a manual compass is provided, it is preferably fixed to the body of the apparatus.

If an electronic compass is provided, the control means facilitates the automatic measurement of the magnetism of the user's present location and transfer of compass point information to the processing means. Preferably, the electronic compass is a terrestrial magnetism unit.

The directional information relating the user present location to the designated geographic location may be displayed by the display means as either a fixed direction (i.e. textual representation of direction) or in compass point format (visual representation of direction). In order to display compass point format, an electronic compass means is provided. The processing means compares the compass point information corresponding to the user's present location to the location of the designated geographic location.

In another aspect of the invention, a mobile communication device is provided, the device including a present location determining unit, a memory, a processor, a display, and a controller. A compass may also be provided.

The present location determining unit facilitates determining the present location of the user. It is contemplated that the present location may be determined by the location of the device or by utilizing user information provided manually on an input device.

The memory contains pre-programmed geographic location information corresponding to the designated geographic location. It is contemplated that the memory may also contain geographic location information corresponding to points on an electronic map as well as predetermined places such as countries, cities and well-known landmarks throughout the world. The geographic location information may be latitude/longitude information or information corresponding to the relative location of the designated geographic location to points on an electronic map or to predetermined places throughout the world. Although the designated geographic location preferably is Mecca, it is contemplated that any geographic location may be the designated geographic location.

The processor is adapted to receive and compare information corresponding to the present location of the user and the designated geographic location. The processor provides directional information, in textual or compass point form, relating the user present location to the location of the designated geographic location.

The display is adapted to display directional information in either textual or compass point format as well as to convey to the user the various options available for entering information. Preferably, the display is an LCD display.

The controller facilitates the various functions of the present location determining unit, memory, processor, display, and electronic compass if provided as well as the transfer of data between them. The controller further facilitates conveying information related to the various options available to the user via the display; for example, the various ways in which user may choose to have his or her present location determined.

The compass may be either an electronic compass, preferably a terrestrial magnetism unit, or a manual compass, preferably fixed to the body of the mobile communication device. The compass provides compass point information related to the user's present location. If an electronic compass is provided, compass point information is retrieved automatically.

In another aspect of the invention, a method of providing directional information related to a designated geographic location is provided. The method includes providing a mobile communication device, receiving information related to the present location of the user, retrieving location information corresponding to the user present location and the designated geographic location, comparing the location information to determine directional information indicating the relative position of the user to the designated geographic location, and displaying the directional information.

The mobile communication device contains, as specified in other aspects of the invention, a present location determining means, a storage means, a processing means, a display means, a control means and, optionally, a compass means. The functions of the various means are also as specified previously.

The user enters information manually. The storage means contains information corresponding to the designated geographic location and may contain information necessary to allow the user present location to be determined by utilizing user provided information. The processing means performs the comparison functions and generates the display information. The display means conveys the display information to the user. The control means coordinates the various information transfers and responds to the information entered by the user. The compass means provides compass point information related to the user's present location.

The control means determines whether the user's present location is to be determined by the location of the device or by utilizing user information input manually. If user present location is determined by the location of the device, the control means communicates with a base station and receives information corresponding to the present location of the device. If user present location is determined utilizing user provided information, the control means receives the user information and facilitates the processing of the information.

If user present location is to be determined by utilizing user provided information, the control means determines what type of user information is received. The user information may contain latitude/longitude information corresponding to the user's present location or information indicating that the user's present location is to be determined by utilizing an electronic map or by user information indicating the name of a place.

If the user information contains latitude/longitude information corresponding to the user's present location, the information is transferred to the processing means as the user's present location. Otherwise, the control means either displays a map and waits for additional user information indicating his or her location on the map or receives user information containing a place name.

If an electronic map is utilized, the control means continues to communicate with the user until a point on the world map is sufficiently defined as the user's present location and retrieves corresponding location information from the storage means. If the user information is a place name, the control means retrieves location information corresponding to the place name from the storage means. The location information retrieved from the storage means is transferred to the processing means.

Once the processing means has generated directional information relating the user present location to the designated geographic location, the control means determines whether the directional information is to be displayed in text format or compass point format. If text format is indicated, the display information is transferred to the display means to be conveyed to the user.

If compass point format is indicated, the control means facilitates receiving and transferring compass point information related to the user present location to the processing means. The compass point information is received via an electronic compass provided in the device. The processing means generates compass point directional information and the control means transfers the information to the display means.

The present invention, which does not rely on a GPS system to determine the present location of the user, provides a cost-effective way for the user of a mobile communication device to determine his or her relative location to a designated geographic location such as Mecca. The device is easier and less expensive to manufacture and operate than a device relying on a GPS system and is lighter because less hardware is required.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 17 is a front view of a display of the present invention illustrating the default base station determination routine in the method illustrated in FIG. 7.

DETAILED DESCRIPTION OF THE PREFERRED EMBODIMENTS

Figure 1:
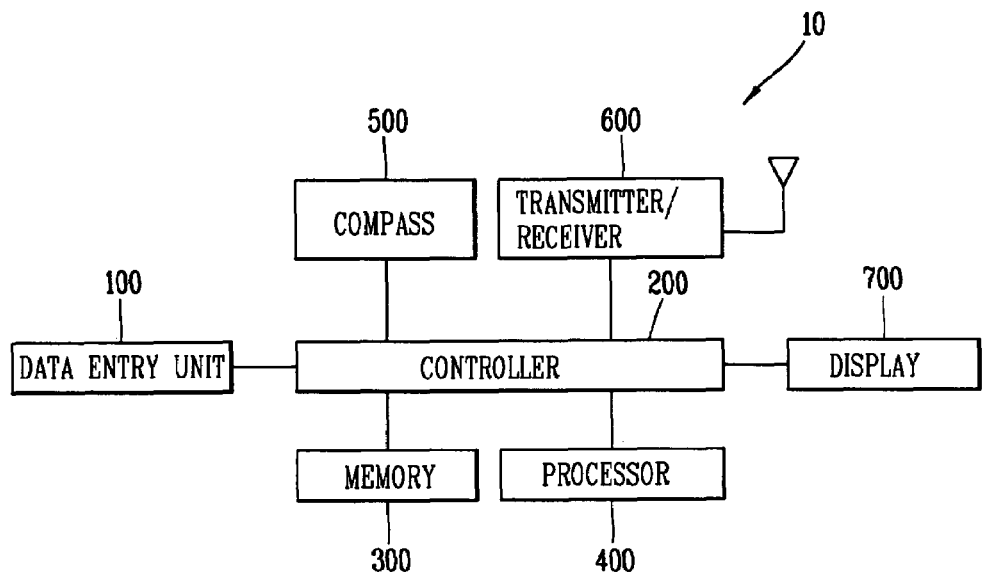
FIG. 1 is a block diagram of an apparatus for providing directional information in a mobile communication apparatus according to the present invention.

The present invention relates to an apparatus and method for providing information that allows the user of the apparatus to determine his or her geographical location relative to another designated geographical location. Although the present invention is illustrated with respect to a mobile communication device, it is contemplated that the present invention may be utilized anytime it is desired to determine one's location in relation to a designated geographical location.

Referring to FIGS. 1-4, one embodiment of the present invention is illustrated. The wireless communication apparatus 10 includes a data entry unit 100, a controller 200, a memory 300, a processor 400, a compass 500, a transmitter/receiver 600, and a display 700.

In addition to performing the normal functions related to wireless communications, the data entry unit 100 allows the user to manually input information related to his or her present geographic location. It is contemplated that the data entry unit 100 may be a keyboard or keypad to facilitate entry of information in textual format. It is further contemplated that the data entry unit 100 may be a microphone to facilitate entry of user information verbally. The data entry unit 100 is under control of the controller.

Figure 2:
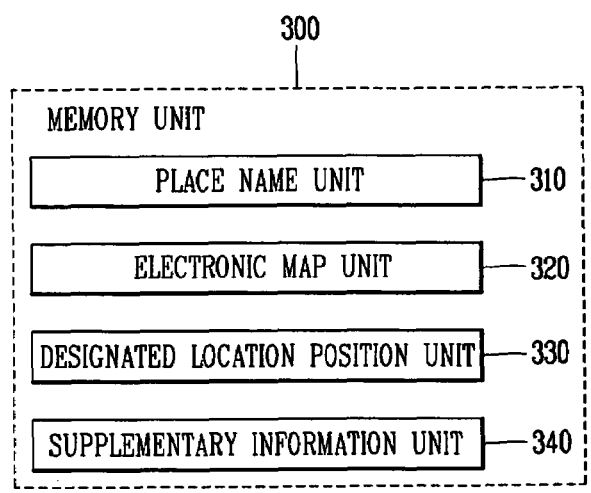
FIG. 2 is a detailed block diagram of the memory of the apparatus illustrated in FIG. 1.

As illustrated in FIG. 2, the memory 300 includes a place name unit 310, an electronic map unit 320, a designated location position unit 330, and a supplementary information unit 340. The retrieval of information from the memory 300 is under control of the controller 200.

The place name unit 310 stores location information corresponding to well-known place names. The well-known places may be countries, cities and landmarks throughout the world. It is contemplated that location information for major cities corresponding to at least 250 countries in the world may be stored.

The information stored in the place name unit 310 may facilitate determining the present location of the user by reference to a nearby country, city or landmark. Alternatively, the place name unit 310 may contain location information regarding predetermined locations, such as cities, for designating the user's present location such that the present location may be compared with location information for the designated geographic location in order to determine the relative location of the user to the designated geographic location, for example Mecca.

The electronic map unit 320 stores an electronic map of the world with the corresponding latitude/longitude information. The electronic map facilitates determining the present location of the user by reference to a world map on which the user may indicate his or her position.

The designated location position unit 330 stores location information corresponding to a geographic location for which related directional information is to be generated. Preferably, the designated geographic location is Mecca, but it is contemplated that an apparatus 10 may be provided containing location information corresponding to any geographic location in the world.

The location information stored in the location position unit 310 may be latitude/longitude information for comparison to latitude/longitude information corresponding to the user's present location. Alternatively, the location information may be directional information relating the designated geographic location to the user's present location which is indicated by latitude/longitude information, a point on an electronic map, or a place name.

The supplementary information unit 340 stores information required for operating the mobile communication apparatus 10. The information stored in the supplemental information unit 340 may not be specific to the designated geographic location or the determination of the user's present location.

Figure 3:
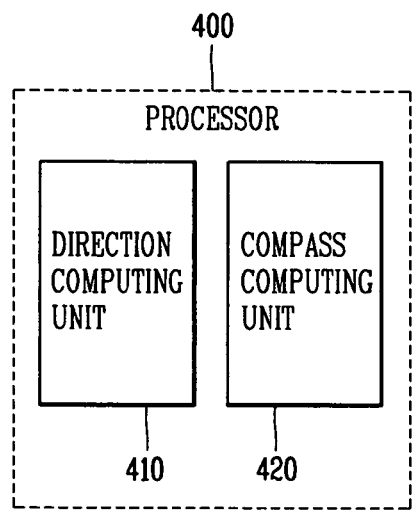
FIG. 3 is a detailed block diagram of the processor of the apparatus illustrated in FIG. 1.

As illustrated in FIG. 3, the processor 400 includes a direction computing unit 410 and a compass computing unit 420, both under control of the controller 200. The direction computing unit 410 receives location information related to the present location of the user and the designated geographic location and compares the information to generate directional information relating the user's present location to the location of the designated geographic location in fixed form as textual information. The compass computing unit 420 receives compass point information related to the present location of the user in order to generate directional information in dynamic compass point form as a visual display of a compass needle. Fixed textual directional information is static to a fixed reference direction. Dynamic compass point directional information is referenced to compass points.

The compass 500 provides information related to the present location of the user in compass point format, for example whether the user is facing North, South, East or West. It is contemplated that the compass may be either electronic or manual. If the compass 500 is electronic, it is preferably a terrestrial magnetism unit and the compass point information is retrieved real-time directly from the compass under control of the controller 200. If the compass is manual, it is preferably fixed to the body of the apparatus and utilized by the user in conjunction with fixed textual directional information displayed by the display 700.

Figure 4:
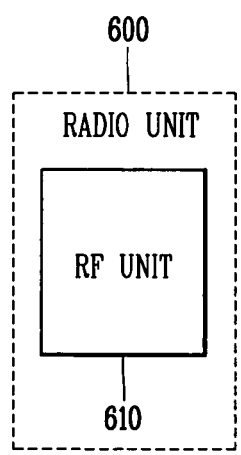
FIG. 4 is a detailed block diagram of the transmitter/receiver of the apparatus illustrated in FIG. 1.

As illustrated in FIG. 4, the transmitter/receiver 600 includes an RF unit 610. The RF unit 610 communicates via radio waves with one of more base stations as the apparatus 10 moves between cells. The RF unit 610 is under control of the controller 200.

The display 700 is capable of displaying directional information in either fixed textual format or dynamic compass point form. The display 700 is under control of the controller 200.

The present location of the user may be determined by the location of the apparatus 10 or by utilizing user information entered via the data entry unit 100. The user may enter information via the data entry unit 100 indicating which of several methods he or she desires to utilize in determining the present location.

If the present location is determined by the location of the apparatus 10, the controller 200 communicates with the base station corresponding to the present cell location via the transmitter/receiver 600. The base station transmits location information to the controller 200. The received location information for the apparatus 10 is then transferred by the controller 200 to the processor 400 as the user's present location.

If user information is utilized to determine present location, it is contemplated that the user may enter latitude/longitude information corresponding to his or her present location, may select his or her present location from a list of well-known places, or may utilize an electronic map to indicate his or her present location. The controller determines the method chosen by the user from information received via the data entry unit 100 and facilitates the corresponding additional functions.

If the user information contains latitude/longitude information related to present location, the controller 200 will transfer the information to the processor 400 as the user's present location. The processor 400 utilizes this information and location information corresponding to the designated geographic location retrieved from the memory 300 by the controller 200 in order to determine the user's position relative to the designated geographic location.

If present location is determined by a map, the controller 200 retrieves map information from the memory 300 and displays the map on the display 700. The user may then input additional information regarding his or her present location, preferably through an interactive process whereby the electronic map displayed is updated to provide further detail based on the additional information, until the controller 200 can retrieve location information corresponding to the user's present location from the memory 300. The retrieved location information is transferred to the processor 400 and utilized to determine the user's position relative to the designated geographic location.

If present location is determined by selecting a nearby well-known place, a list of countries, cities, and landmarks is retrieved from the memory 300 by the controller 200 and displayed on the display 700. The user may then input additional information, selecting one of the displayed countries, cities or landmarks. The controller 200 retrieves the location information corresponding to the selected country, city or landmark from the memory 300. The retrieved location information is transferred to the processor 400 and utilized to determine the user's position relative to the designated geographic location.

Once the processor 400 receives the location information corresponding the user's present location and the location information corresponding to the designated geographic location, the information is compared. The direction computing unit 410 generates directional information relating the user's present location to the location of the designated geographic location.

If directional information is displayed in fixed form as textual information, the controller 200 transfers the directional information from the direction computing unit 410 to the display 700. A manual or compass 500 may be provided to enable the user to utilize the directional information.

If the directional information is displayed in dynamic compass point form as a visual display of a compass needle, the compass computing unit 420 of the processor 400 utilizes compass point information regarding the user's present location to translate the fixed form directional information into compass point directional information. The compass point information regarding the user's present location may be obtained from an electronic compass 500. An electronic compass, preferably a terrestrial magnetism unit under control of the controller 200, may be used to obtain user compass point information real-time with the information transferred directly to the compass computing unit 420 of the processor 400.

Figure 5:
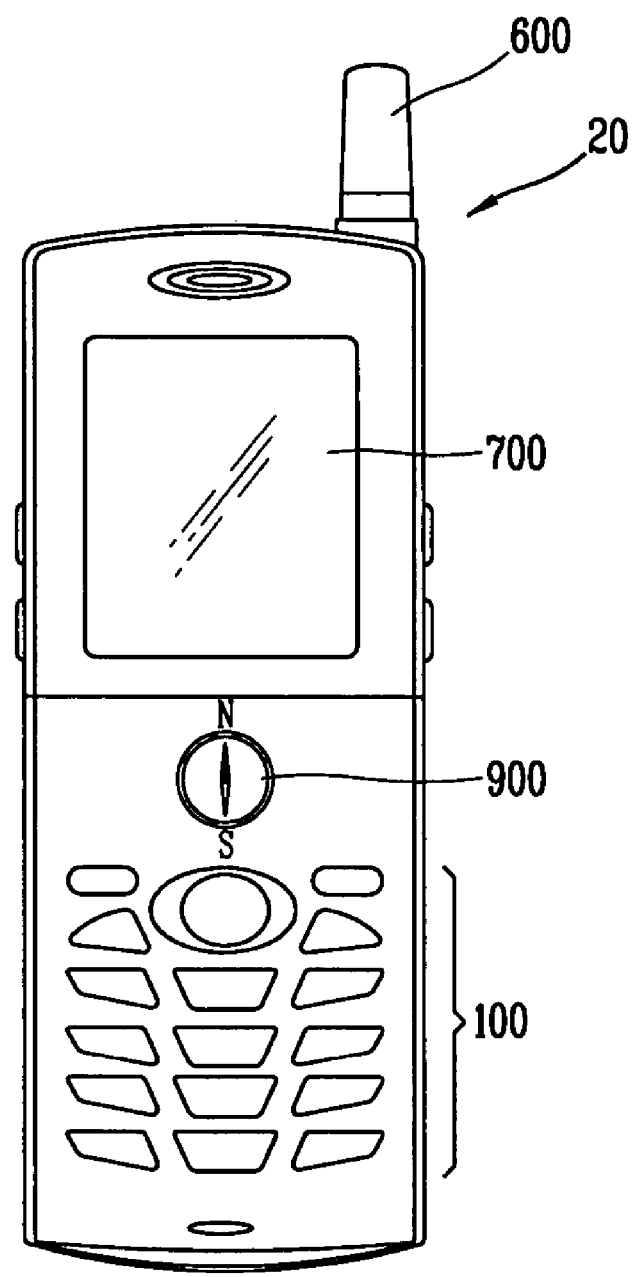
FIG. 5 is a front view of a mobile communication device of the present invention having a manual compass fixed directly to the body of the device.
Figure 6:
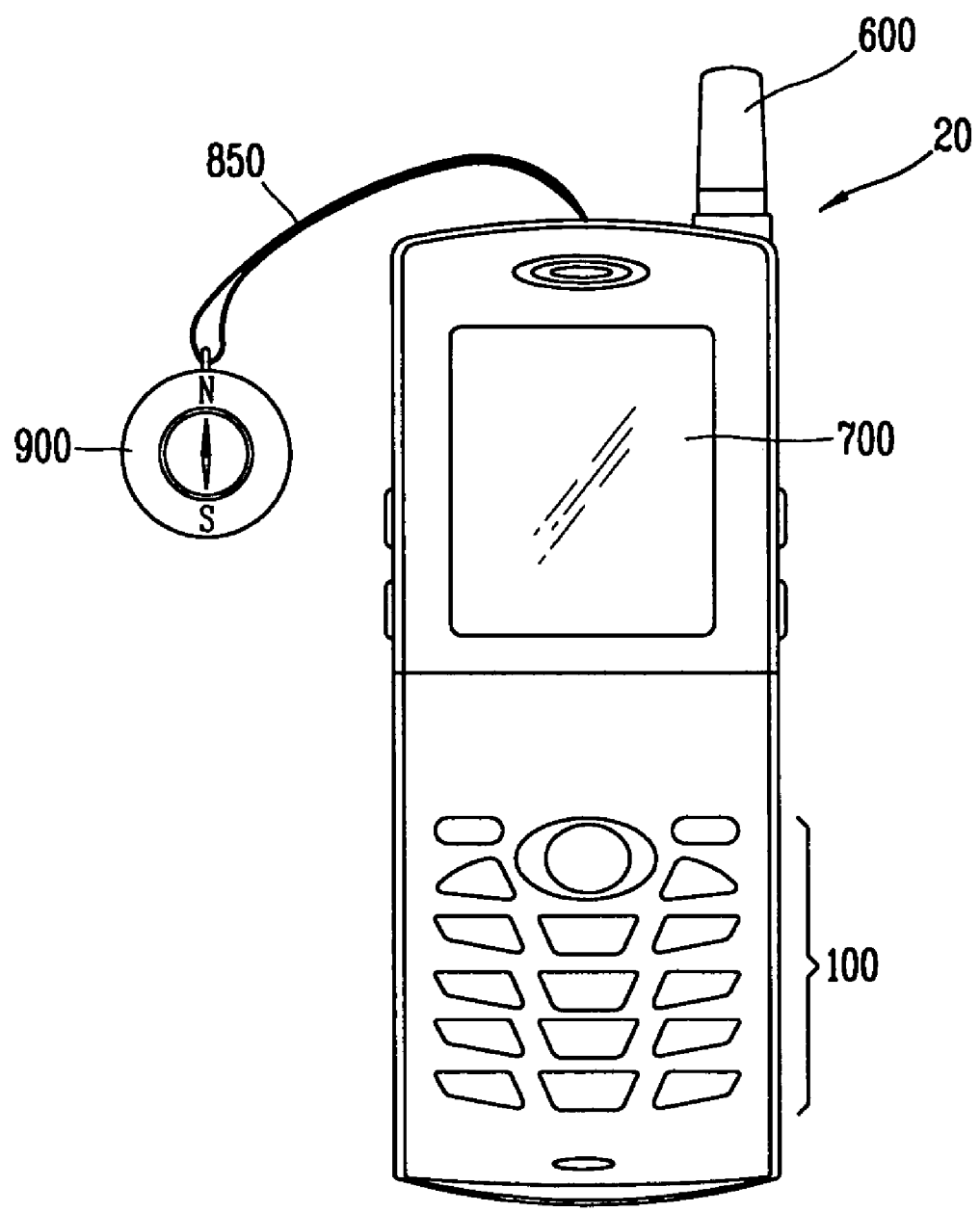
FIG. 6 is a front view of a mobile communication device of the present invention having a manual compass fixed to the body of the device by a fixation strap.

Referring to FIGS. 5 and 6, two additional embodiments of the present invention are illustrated. The mobile communication device 20 includes a keypad 100, a manual compass 900, a transmitter/receiver 600, and an LCD display 700. It is contemplated that the manual compass 90 may be fixed to the body of the device, as illustrated in FIG. 5, or separate from the body of the device and connected by a fixing strap 850, as illustrated in FIG. 6.

Because the present invention does not require a GPS system, the size of the memory 300 may be reduced and it is unnecessary to have an expensive and bulky GPS receiver. Therefore, the device 20 of the present invention may be smaller, lighter and cheaper to manufacture and operate.

Referring to FIGS. 7-17, a method of the present invention is illustrated. The method illustrated in FIGS. 7-17 is under control of the controller 200. Although the method is illustrated with respect to providing directional information where the designated geographic location is Mecca, it is contemplated that the method depicted may be applied to any designated geographic location.

Figure 7:
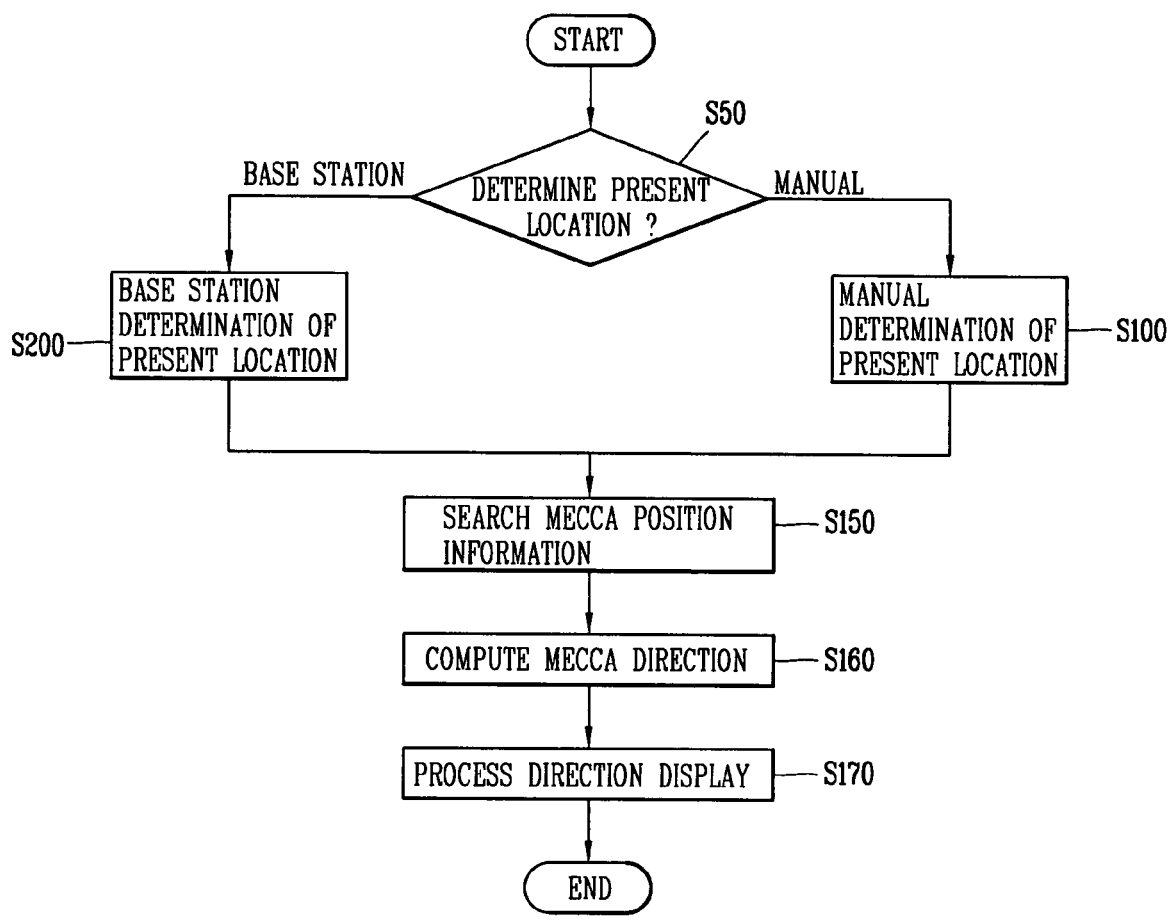
FIG. 7 is a flowchart of a method for providing directional information in a mobile communication apparatus according to the present invention.

FIG. 7 illustrates the top-level routine for determining user present location and generating directional information. Step S50 determines whether present location is to be determined manually with user information provided via the data entry unit 100 or via the location of the wireless communication apparatus 10 as determined by the base station.

If user present location is determined manually, the manual determination step S100 utilizes user information provided via the data entry unit 100 to determine the location information corresponding to the user's present location. The location information is transferred to the processor 400.

If the location of wireless communication apparatus 10 is used to determine user present location, the base station determination step S200 communicates with the base station corresponding to the cell in which the wireless communication apparatus 10 is located and retrieves location information corresponding to the present location of the device. The location information is transferred to the processor 400 as the user's present location.

The search Mecca step S150 retrieves location information for Mecca from the designated geographic location position unit 330 of memory 300. The compute Mecca direction step S160 compares the location information from step S100 or S200, corresponding to the user's present location, to the location information from step S150, corresponding to Mecca, to determine the user's relative location with respect to Mecca.

The process direction display step S170 displays the directional information from step S160 as either static textual information relative to a fixed reference direction or dynamic compass point information relative to a real-time compass point corresponding to the user's present location. If the directional information is displayed as compass point information, information from the compass 500 is utilized.

Figure 8:
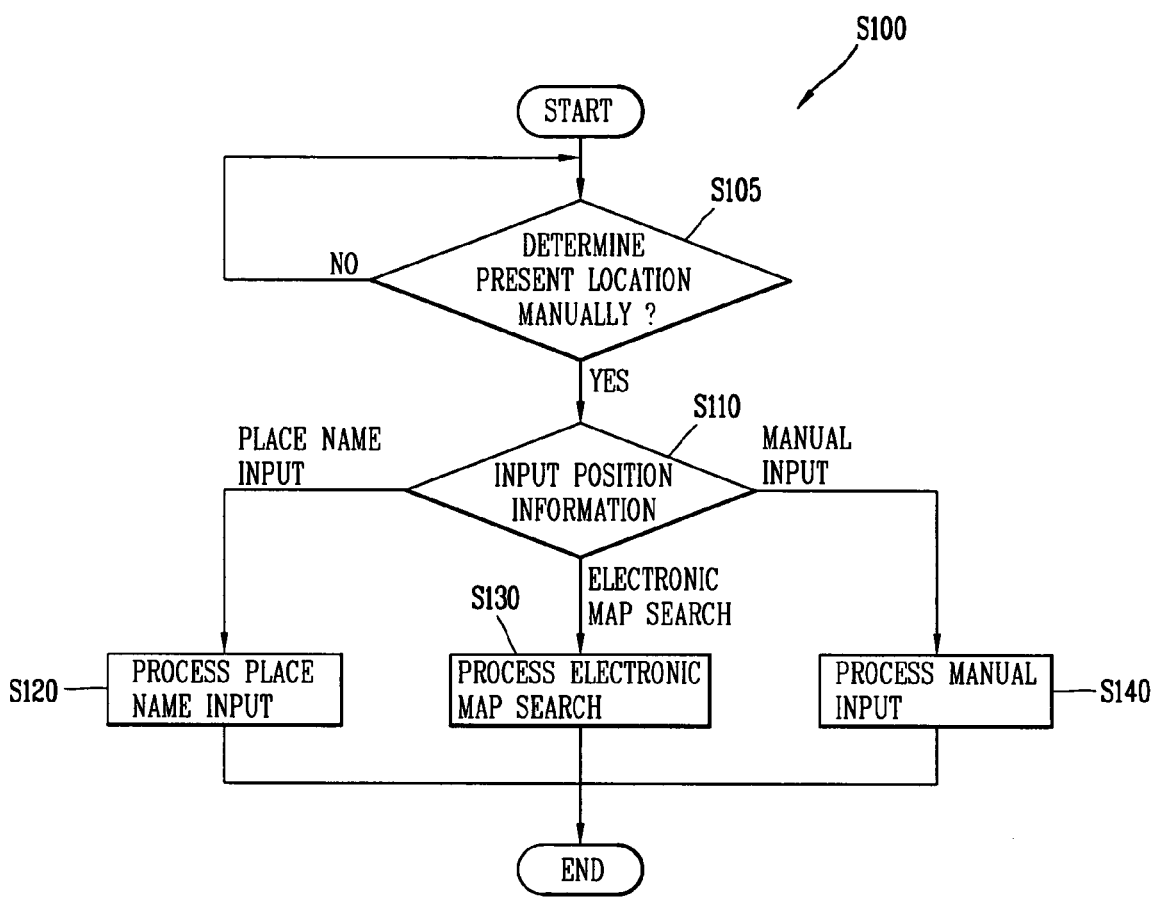
FIG. 8 is a flowchart of the manual determination routine in the method illustrated in FIG. 7.

FIG. 8 illustrates the manual determination step S100. Step S105 determines if the user's present location is to be determined by entering information manually. If so, the input position step S110 determines which manual mode of present location determination is to be used; indicate present location as latitude/longitude information, use an electronic map to indicate present location, or select a place name to indicate present location.

The place name routine step S120 displays a list of well-known place names retrieved from memory 300 on the display 700, thereby allowing the user to indicate present location by selecting a place name. The map routine step S130 displays an electronic map retrieved from memory 300 on the display 700, thereby allowing the user to indicate present position on a map. The manual routine step S140 allows the user to manually input latitude/longitude information corresponding to present location. Once the user's present location is determined, the location information corresponding to the user's present location is transferred to the processor 400.

Figure 9:
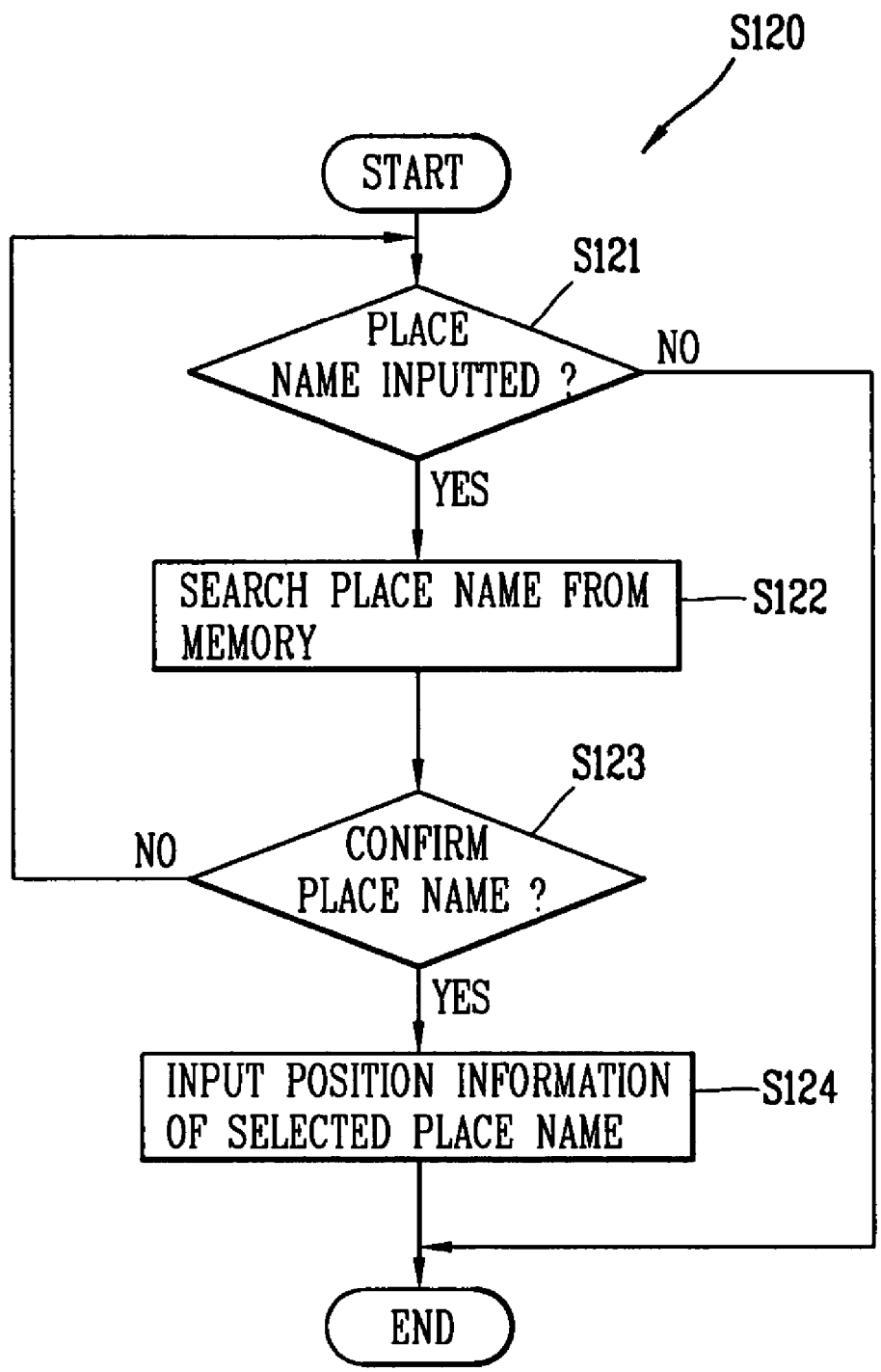
FIG. 9 is a flowchart of the place name routine in the manual determination routine illustrated in FIG. 8.

FIG. 9 illustrates the place name routine step S120. Step S121 determines if the user has input user information via the data entry unit 100. If so, the search place name step S122 retrieves a list of place names corresponding to the user information from the place name unit 310 of memory 300 and displays the names on the display 700.

The confirm place name step S123 determines whether the user has selected one of the displayed place names as the present location. If the one of the displayed place names is not confirmed, the routine returns to step S121 to await additional user information to be input. If one of the displayed place names is confirmed, the input position information step S124 retrieves the location information corresponding to the selected place name from the place name unit 310 of memory 300 and transfers the location information to the direction computing unit 410 of the processor 400 as the user's present location.

Figure 10:
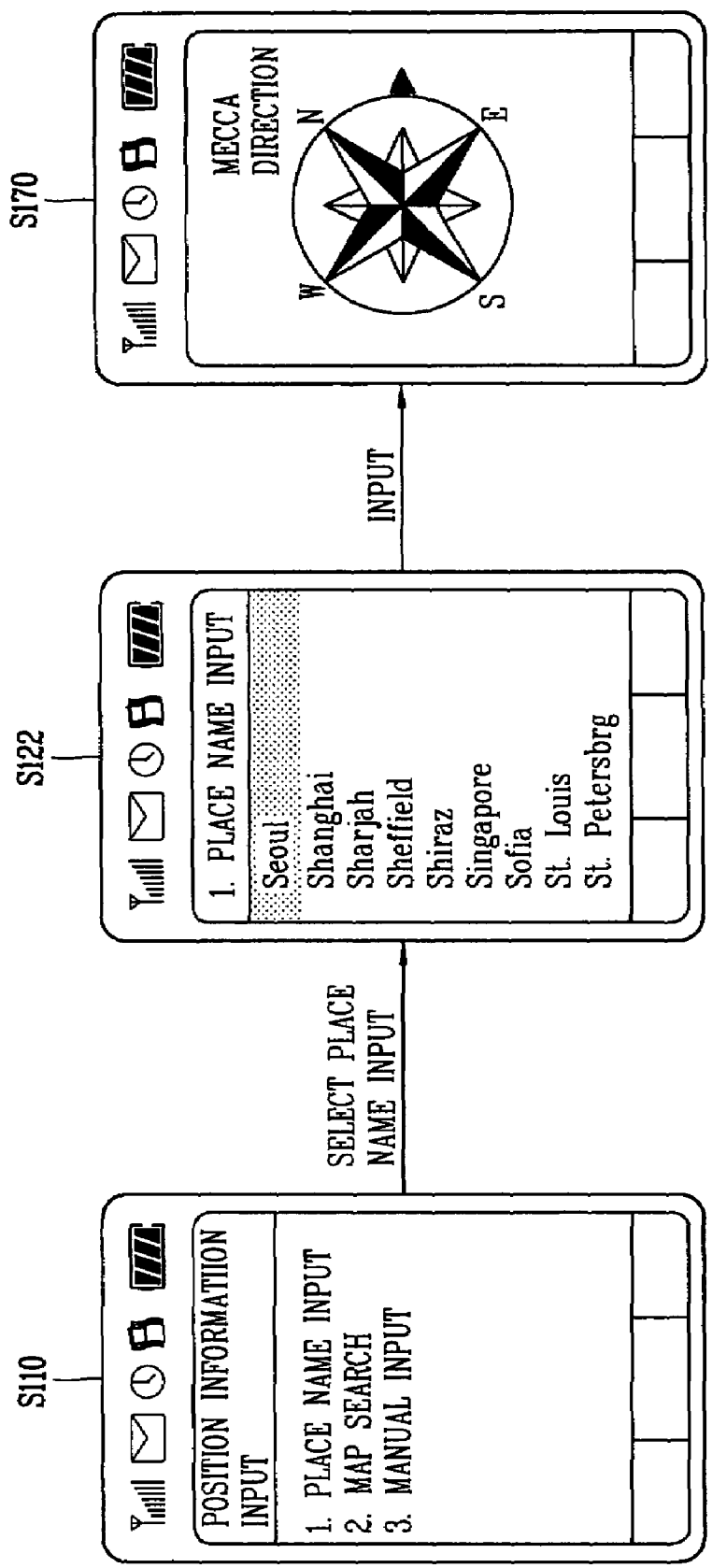
FIG. 10 is a front view of a display of the present invention illustrating the screens displayed by the place name routine illustrated in FIG. 9.

FIG. 10 illustrates various embodiments of typical screens from the display 700 when the user's present location is determined by the place name routine step S120. The input position step S110 displays a menu allowing the user to select a place name search (step S120), a map search (step S130), or a manual input (step S140).

When the user selects a place name search (step S120) and inputs user information consisting of a place name (step S121) using the data entry unit 100, a list of place names corresponding to the user information is displayed (step S122). When the user selects one of the displayed place names (step S123) using the data entry unit 100, the location information corresponding to the selected place name is retrieved from memory 300 and transferred to the processor 400 (step S124). The processor 400 generates directional information (step S160) which is displayed on the display 700 (step S170).

Figure 11:
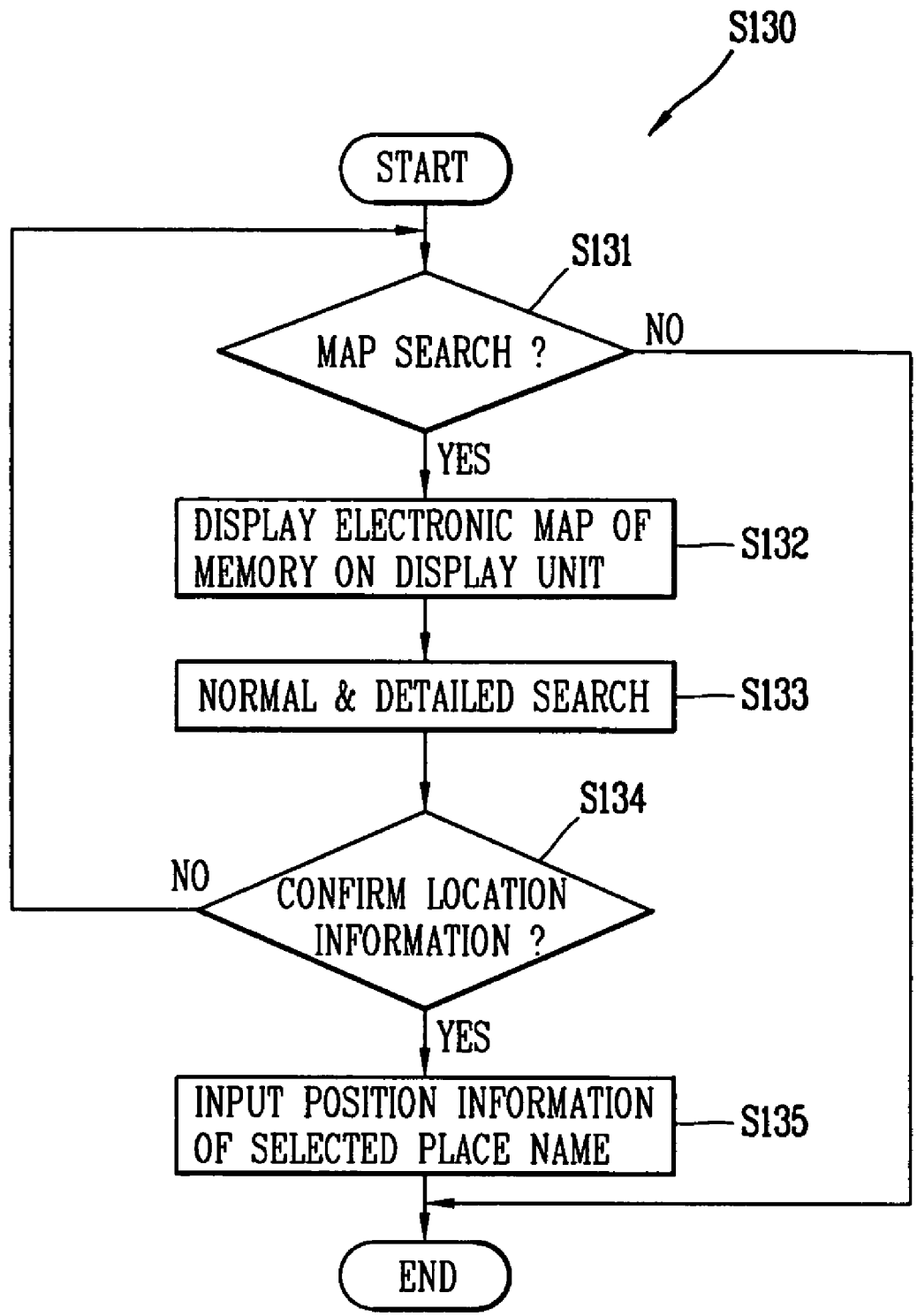
FIG. 11 is a flowchart of the map routine in the manual determination routine illustrated in FIG. 8.

FIG. 11 illustrates the map routine step S130. Step S131 determines if user present location is to be determined by utilizing an electronic map. If so, the display electronic map step (step S132) displays an electronic map on the display 700. When the user uses the data entry unit 100 to indicate his or her present location on the displayed electronic map, the search step S133 retrieves location information corresponding to the user's indicated present location from the memory 300.

It is contemplated that the map routine step S130 may be an iterative process during which the displayed electronic map may be adjusted to provide greater detail of the location indicated by the user as the user makes additional indications of his or her present location. For example, the initial display of the electronic map in electronic map step S132 may be a world map. After the user indicates country of present location, additional steps S132 may display, in succession, a map of the indicated country, a map of an indicated city in the indicated country, a map of an indicated area of the indicated city, the additional electronic maps displayed in response to additional information entered by the user.

The confirm location step S134 determines whether the user has confirmed that the location information from step S133 is selected as the user's present location. If the location information is not confirmed, the routine returns to step S131. If the location information is confirmed, the input position information step S135 transfers the location information retrieved in step S133 to the processor 400 as the user's present location.

FIGS. 12A-D illustrate various embodiments of typical screens from the display 700 when the user's present location is determined by the map routine step S130. In the illustrated example, the location information stored in the memory 300 is latitude/longitude information. The input position step S110 displays a menu allowing the user to select a place name search (step S120), a map search (step S130), or a manual input (step S140).

Figure 12A:
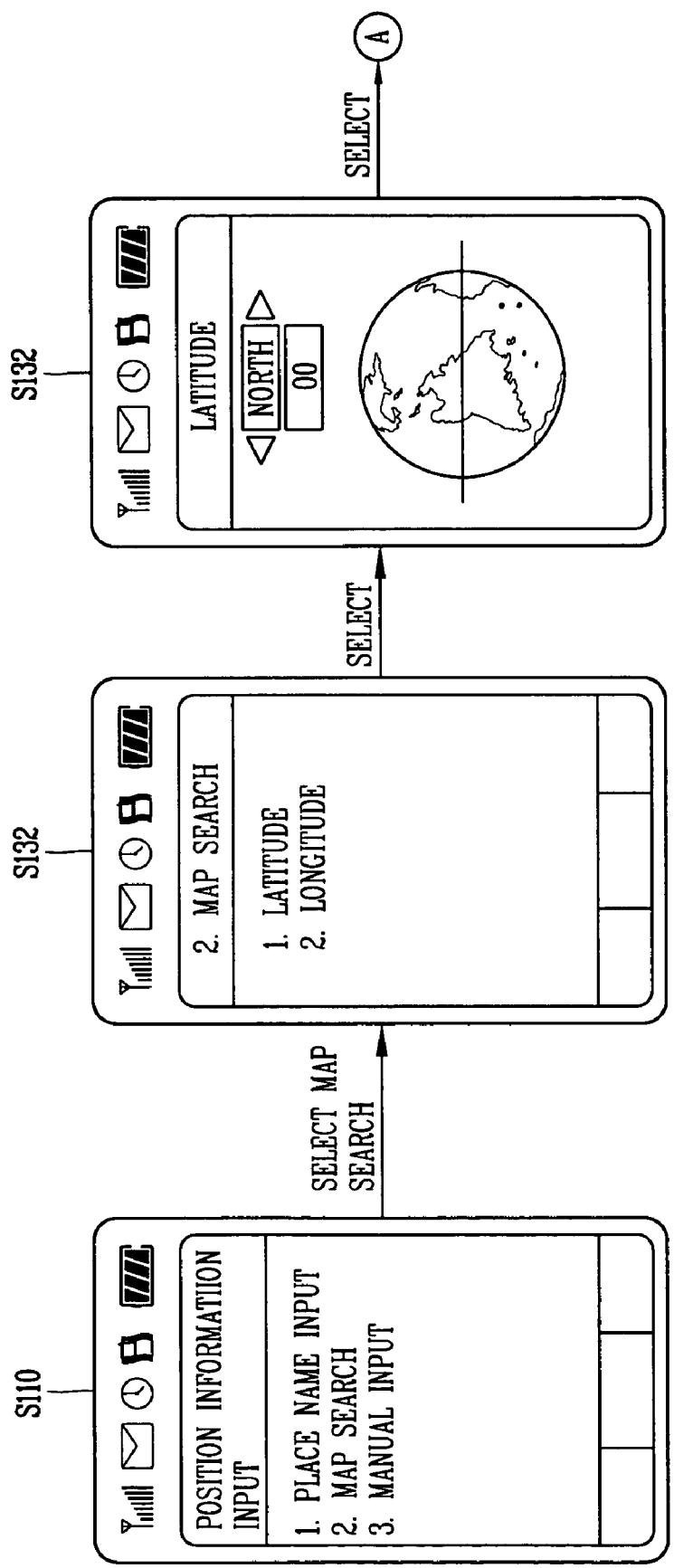
FIG. 12 is a front view of a display of the present invention illustrating the screens displayed by the map routine illustrated in FIG. 11.

Referring to FIG. 12A, when the user selects a map search (step S130), a menu is displayed allowing the user to select either latitude or longitude (step S132). When the user selects latitude, an electronic map is retrieved from memory 300 and displayed (step S132) with a graphic indicating that latitude user information is to be determined and a cursor (indicated as a horizontal line on the display 700).

Referring to FIG. 12B, the search step S133 is performed as the user moves the cursor via the data entry unit 100. Once the user confirms that the proper latitude location has been selected on the display 700, the latitude information is saved (step S134) and a menu is again displayed allowing the user to select either latitude or longitude (step S132). As illustrated in FIG. 12B, the user confirmed a present location of 35 degrees north latitude.

Referring to FIG. 12C, when the user selects longitude, an electronic map is again retrieved from memory 300 and displayed (step S132) with a graphic indicating that longitude user information is to be determined and a cursor (indicated as a vertical line on the display 700). The search step S133 is again performed as the user moves the cursor via the data entry unit 100. Once the user confirms that the proper longitude location has been selected on the display 700, the longitude information is saved (step S134) and a menu is again display allowing the user to select either latitude or longitude. As illustrated in FIG. 12C, the user confirmed a present location of 135 degrees east longitude. If the user determines that the correct present location has not been saved, he can again select longitude or latitude and repeat the selection process.

Figure 12D:
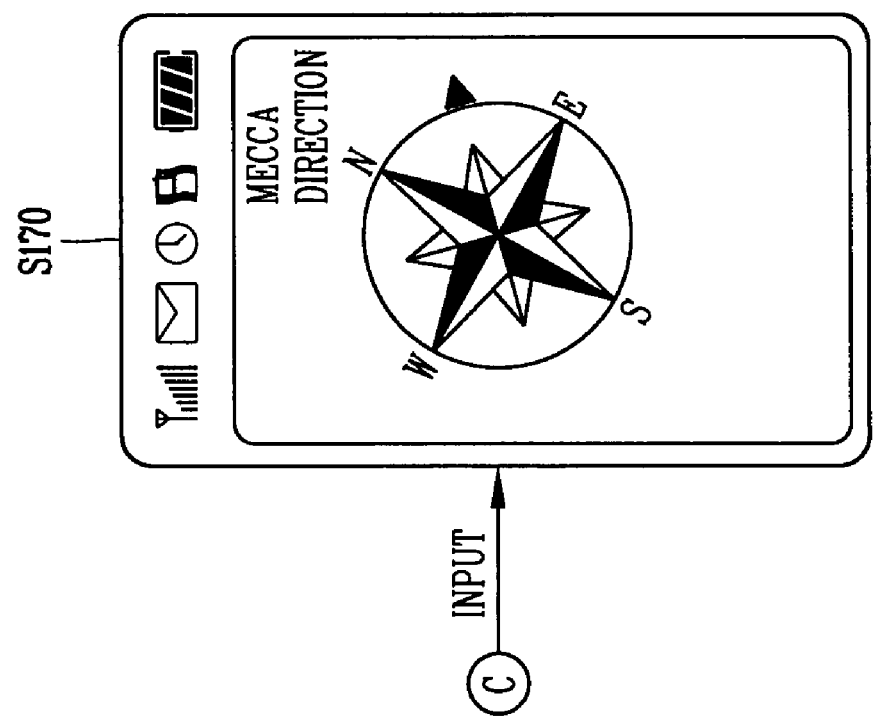

Referring to FIG. 12D, when the user indicates that the correct present location has been saved, the saved latitude/longitude information is transferred to the processor 400 (step S135). The processor 400 generates directional information (step S160) which is displayed on the display 700 (step S170).

Figure 13:
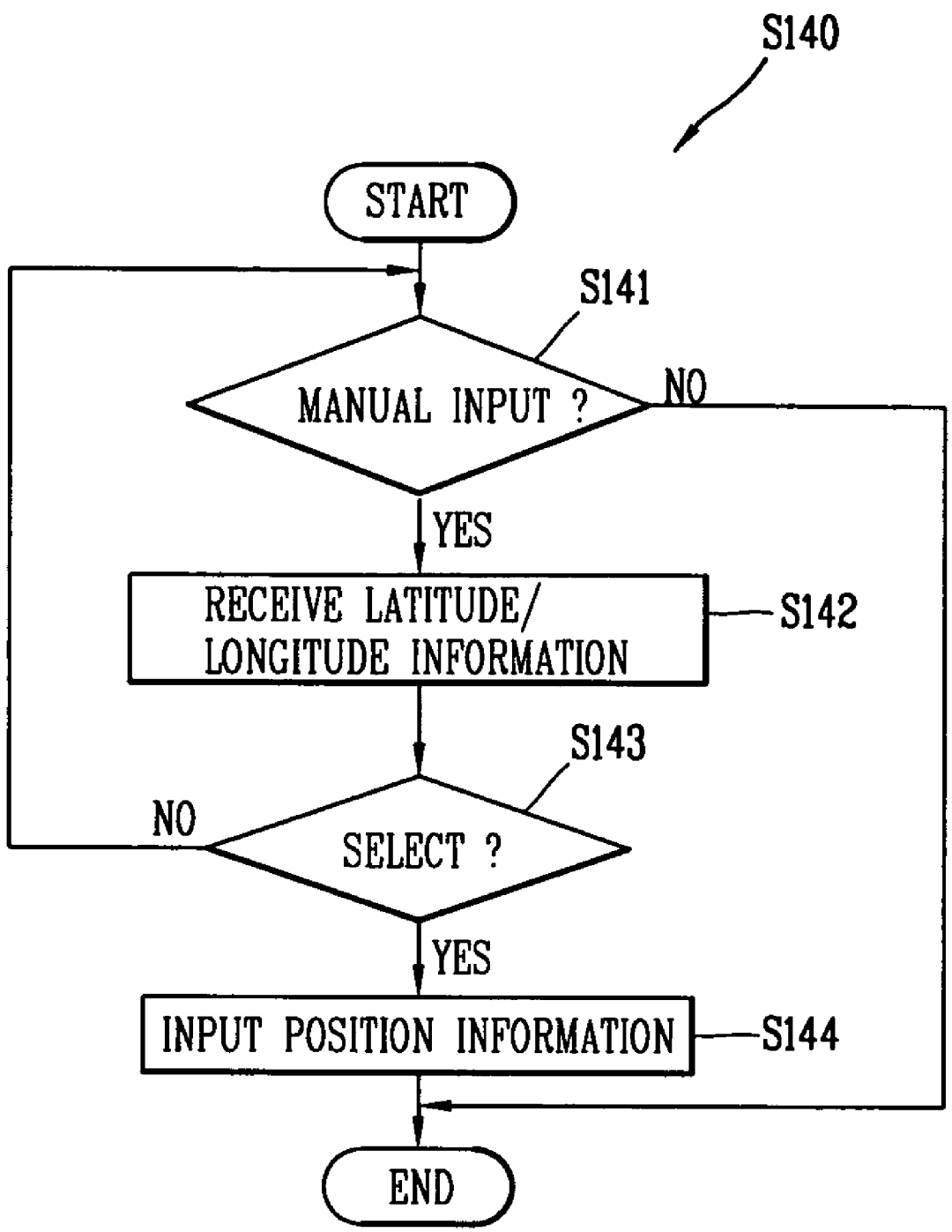
FIG. 13 is a flowchart of the manual input routine in the manual determination routine illustrated in FIG. 8.

FIG. 13 illustrates the manual routine step S140. Step S141 determines if user present location is to be determined by the user manually inputting, via the data entry unit 100, the longitude and latitude information corresponding to his or her present location and waits for user information to be input.

The receive latitude/longitude step S142 receives the latitude/longitude information from the data entry unit 100.

The select step S143 determines whether the user has confirmed that the information received in step S142 is selected as the user's present location. If the information is not confirmed, the routine returns to step S141. If the selected location is confirmed, the input position information step S144 transfers the latitude/longitude information received in step S142 to the processor 400 as the user's present location.

Figure 14:
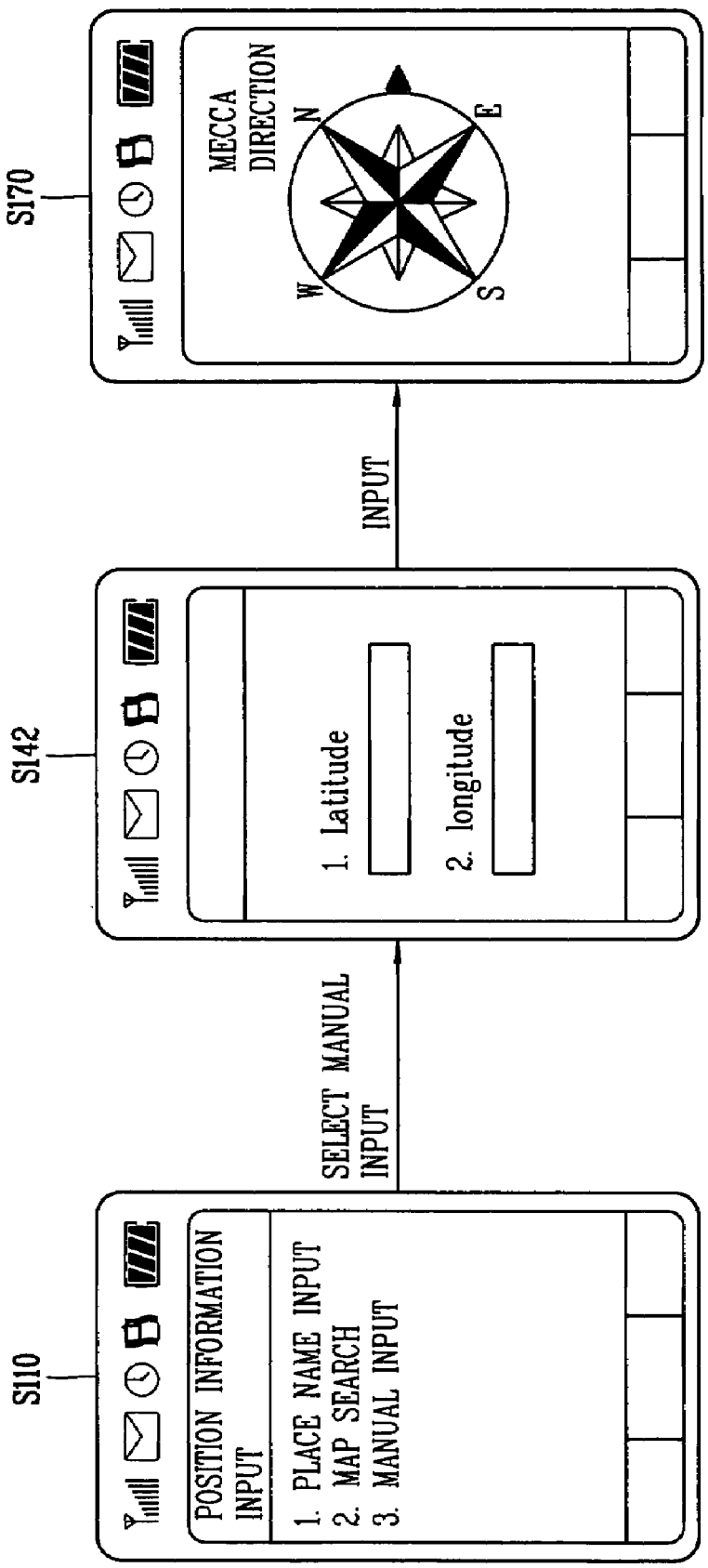
FIG. 14 is a front view of a display of the present invention illustrating the screens displayed by the manual input routine illustrated in FIG. 13.

FIG. 14 illustrates various embodiments of typical screens from the display 700 when the user's present location is determined by the manual routine step S140. The input position step S110 displays a menu allowing the user to select a place name search (step S120), a map search (step S130), or a manual input (step S140).

When the user selects manual entry of present location (step S140) a screen is displayed allowing the user to manually input the longitude and latitude corresponding to his or her present location and the routine waits for the user to input information (step S142).

When the user inputs longitude and latitude information via the data entry unit 100, the user information is retrieved from the data entry unit 100 (step S142). Upon confirmation by the user that the inputted longitude and latitude information is correct (step S143), the latitude/longitude information is transferred to the processor 400 (step S144). The processor 400 generates directional information (step S160) which is displayed on the display 700 (step S170).

Figure 15:
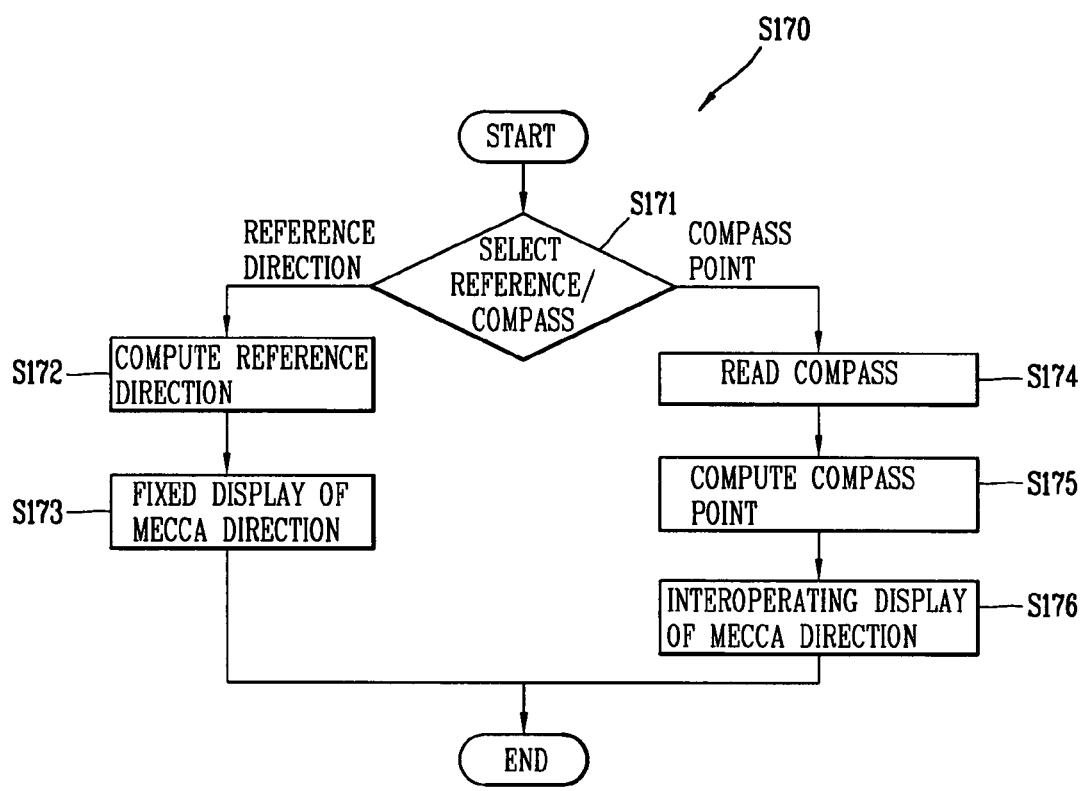
FIG. 15 is a flowchart of the direction display routine in the method illustrated in FIG. 7.

FIG. 15 illustrates the process direction display step S170. Step S171 determines whether the directional information generated in the compute Mecca step S160 is to be displayed as static textual information relative to a fixed reference direction or dynamic compass point information relative to a real-time compass point corresponding to the user's present location. It is contemplated that upon power-off or interruption of power to the mobile communication apparatus, the display of the directional information may be maintained.

If the directional information is to be displayed as static textual information relative to a fixed reference, the compute reference step S172 utilizes the direction computing unit 410 of the processor to determine the relation between the reference direction and the Mecca direction. The fixed display step S173 displays the static textual directional information on the display 700.

If the directional information is to be displayed as dynamic compass point information, the read compass step S174 determines the compass point information corresponding to the user's present location. The compute compass point step S175 generates the compass point directional information by utilizing the compass computing unit 420 of the processor 400 to compare the compass point information corresponding to the user present location from step S174 to the location of Mecca from step S160. The compass point directional information is displayed on the display 700 as dynamic compass point directional information by the interoperating display step S176. Even if the user is moving, the display of the directional information may be updated dynamically so that it remains accurate.

Figure 16:
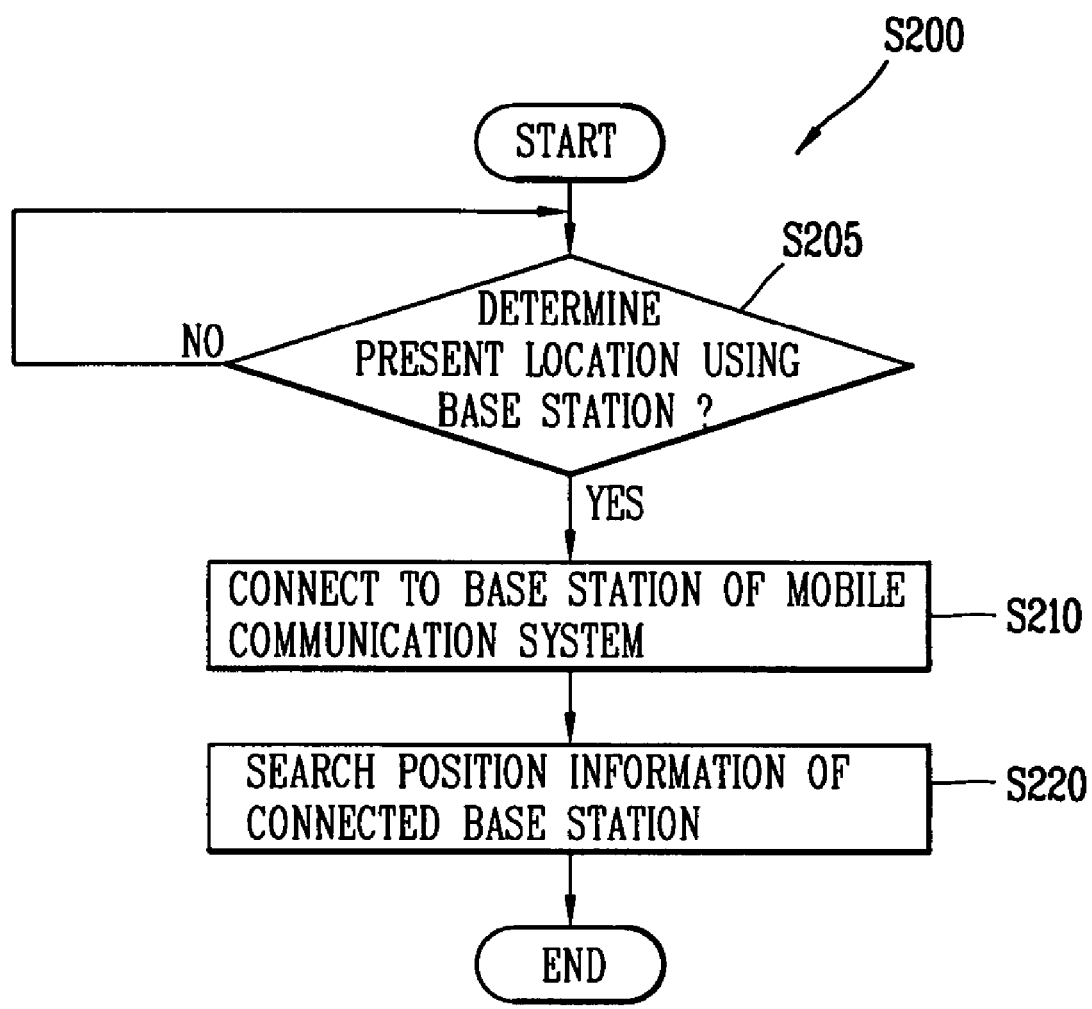
FIG. 16 is a flowchart of the base station determination routine in the method illustrated in FIG. 7.

FIG. 16 illustrates the base station determination routine step S200. Step S205 determines if user present location is to be determined by the location of the base station. If so, the controller 200 communicates with the base station corresponding to the cell in which the wireless communication apparatus 10 is presently located.

The connect to base station step S210 utilizes the RF unit 610 of the transmitter/receiver 600 to communicate with the appropriate base station in order to access the database of the wireless communication apparatus 10. The search position step S220 searches the database of the device to retrieve the location information corresponding to the present location of the apparatus 10.

It is contemplated that the default state of the wireless communication apparatus may be to determine the user's present location via the base station determination routine step S200. As illustrated in FIG. 17, if there is no user input to the menu displayed by the input position step S110 of the manual determination routine step S100, the base station determination routine step S200 is performed. The present location of the user is determined by the present location of the apparatus and the corresponding location information is transferred to the processor 400. The processor 400 generates directional information (step S160) which is displayed on the display 700 (step S170).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication apparatus for representing directional information to a user, comprising:
   present location determining means for determining present location in response to at least one of location information from a base station and a user input;
   storage means for storing location information for a designated geographic location, the designated geographic location not dependent upon the present location;
   processing means for receiving information regarding the present location and the location of the designated geographic location in order to determine directional information, the directional information relating the present location to the location of the designated geographic location;
   display means for displaying the directional information; and
   control means for monitoring/controlling the function of at least one of the present location determining means, storage means, processing means, and display means.

2. The apparatus of claim 1, wherein the present location determining means utilizes a user input to determine the present location.

3. The apparatus of claim 1, wherein the present location determining means utilizes information received from a base station to determine present location.

4. The apparatus of claim 1, the storage means containing location information corresponding to place names and wherein the control means retrieves place name location information from the storage means and provides the place name location information to the processing means.

5. The apparatus of claim 4, wherein the place names comprise at least one of names of major cities, names of major countries, and names of predetermined destinations throughout the world.

6. The apparatus of claim 4, wherein the location information comprises latitude/longitude information.

7. The apparatus of claim 4, wherein the location information comprises directional information.

8. The apparatus of claim 2, wherein the user input comprises one of a place name corresponding to a predetermined location stored in the storage means, points on an electronic map displayed by the display means, latitude information corresponding to the present location, and longitude information corresponding to the present location.

9. The apparatus of claim 8, wherein the control means retrieves location information corresponding to the user input from the storage means and provides the information to the processing means.

10. The apparatus of claim 9, wherein the user input comprises at least one of latitude and longitude information.

11. The apparatus of claim 8, wherein the control means provides the user input to the processing means as the present location.

12. The apparatus of claim 8, the user input comprising a place name and wherein the control means retrieves location information corresponding to the place name from the storage means and provides the information to the processing means.

13. The apparatus of claim 1 further comprising a compass means for translating the present location into compass point user information.

14. The apparatus of claim 13, wherein the compass means is an electronic compass fixed directly to the apparatus and the control means retrieves compass point user information from the compass.

15. The apparatus of claim 14, wherein the compass means is a terrestrial magnetism unit.

16. The apparatus of claim 13, wherein the compass means is a mechanical compass.

17. The apparatus of claim 16, wherein the compass is fixed directly to the apparatus.

18. The apparatus of claim 1, wherein the display means displays the directional information as a fixed direction.

19. The apparatus of claim 1, wherein the display means displays the directional information as compass points.

20. The apparatus of claim 1, wherein the designated geographic location is Mecca.

21. A mobile communication device for representing directional information to a user, comprising:
   a present location determining unit for determining present location in response to at least one of location information from a base station and a user input;
   memory containing location information corresponding to a designated geographic location, the designated geographic location not dependent upon the present location;
   a compass;
   a processor for receiving information regarding the present location and the location of the designated geographic location in order to determine directional information, the directional information relating the present location to the location of the designated geographic location;
   a display for displaying the directional information as either a fixed direction or compass points; and
   a controller for monitoring/controlling the function of at least one of the data entry unit, memory, processor, and display.

22. The device of claim 21, wherein the controller retrieves latitude/longitude information from the memory and provides the latitude/longitude information to the processor as the present location of the user.

23. The device of claim 21, wherein present location is determined by the location of the device and the controller receives location information corresponding to the present location of the device from a base station and provides the received location information to the processor.

24. The device of claim 21, wherein present location is determined by a user input.

25. The device of claim 24, wherein the user input comprises latitude/longitude information and the controller provides the user input to the processor as the present location.

26. The device of claim 24, wherein the user input comprises a place name and the controller retrieves location information corresponding to the place name from the memory and provides the retrieved location information to the processor.

27. The device of claim 24, wherein the user input comprises a point on an electronic map displayed by the display and the controller retrieves location information corresponding to the user input from the memory and provides the retrieved location information to the processor.

28. The device of claim 21, wherein the compass is a terrestrial magnetism unit fixed directly to the apparatus and the controller retrieves compass point user information from the compass.

29. The device of claim 21, wherein the compass is a mechanical compass.

30. The device of claim 29, wherein the compass is fixed directly to the device.

31. The device of claim 21, wherein the designated geographic location is Mecca.

32. A method of providing directional information related to a designated geographic location, comprising:
   providing a mobile communication device having present location determining means, storage means, processing means, display means, and control means;
   determining present location by receiving at least one of location information from a base station and a user input;
   comparing present location to location information corresponding to the designated geographic location in order to generate directional information, the directional information relating the present location to the location of the designated geographic location, the designated geographic location not dependent upon the present location; and
   displaying the directional information.

33. The method of claim 32, further comprising:
   determining that present location is determined by the location of the device;
   communicating with a base station to receive location information corresponding to the location of the device; and
   transferring the received location information to the processing means as the present location of the user.

34. The method of claim 32, further comprising:
   determining that present location of the user is determined by reference to an electronic map;
   displaying an electronic map;
   receiving user input comprising information related to the electronic map;
   retrieving location information corresponding to the user input from the storage means and transferring the retrieved location information to the processing means.

35. The method of claim 32, further comprising:
   determining that a user input comprises one of latitude and longitude information corresponding to present location; and
   transferring the user input to the processing means as the present location of the user.

36. The method of claim 32, further comprising determining that directional information is to be displayed in compass point format and comparing compass point information related to the present location to the location of the designated geographic location in order to generate directional information.

37. The method of claim 36, further comprising:
providing an electronic compass in the mobile communication device; and
retrieving compass point information from the compass and transferring the compass point information to the processing means.

38. The method of claim 32, where the designated geographic location is Mecca.

* * * * *